United States Patent
Yoneyama et al.

(10) Patent No.: US 6,181,487 B1
(45) Date of Patent: Jan. 30, 2001

(54) PHOTOGRAPHIC LENS

(75) Inventors: Shuji Yoneyama; Nobutaka Minefuji, both of Saitama (JP)

(73) Assignee: Asahi Kogaku Kogyo Kabushiki Kaisha, Tokyo (JP)

( * ) Notice: Under 35 U.S.C. 154(b), the term of this patent shall be extended for 0 days.

(21) Appl. No.: 09/121,983

(22) Filed: Jul. 24, 1998

(30) Foreign Application Priority Data

Jul. 31, 1997 (JP) ...................................................... 9-219894

(51) Int. Cl.$^7$ ................................ G02B 9/62; G02B 9/00
(52) U.S. Cl. ............................................. 359/759; 359/754
(58) Field of Search .................................. 359/754, 755, 359/756, 759

(56) References Cited

U.S. PATENT DOCUMENTS 4,784,480  11/1988  Yokota et al. .

FOREIGN PATENT DOCUMENTS 51-39529  10/1976  (JP) .
58-9117   1/1983   (JP) .
51-34176 * 5/1993   (JP) .

* cited by examiner

Primary Examiner—Georgia Epps
Assistant Examiner—Suzanne Letendre
(74) Attorney, Agent, or Firm—Greenblum & Bernstein, P.L.C.

(57) ABSTRACT

A photographing lens includes a front lens unit and a rear lens unit that are arranged in this order from the object side. The front lens unit comprises, in this order from the object side, a first lens element which is a positive meniscus lens having a convex surface facing the object side, a second lens element which is a positive meniscus lens having a convex surface facing the object side and a third lens element that is cemented to the second lens element. The third lens element is a negative meniscus lens having a convex surface facing the object side. The rear lens group comprises, in this order from the object side, a fourth lens element which is a positive meniscus lens having a convex surface facing the image side, a fifth lens element which is a negative meniscus lens having a concave surface facing the object side and a sixth lens element which is cemented to the fifth lens element. The sixth lens element is a positive meniscus lens having a convex surface facing the image side. The front lens group and the rear lens group are moved towards the object side so that the distance between the front and rear lens groups becomes larger when a focusing operation is performed on an object at a closer object distance than when a focusing operation is performed on an object at a longer object distance.

8 Claims, 4 Drawing Sheets

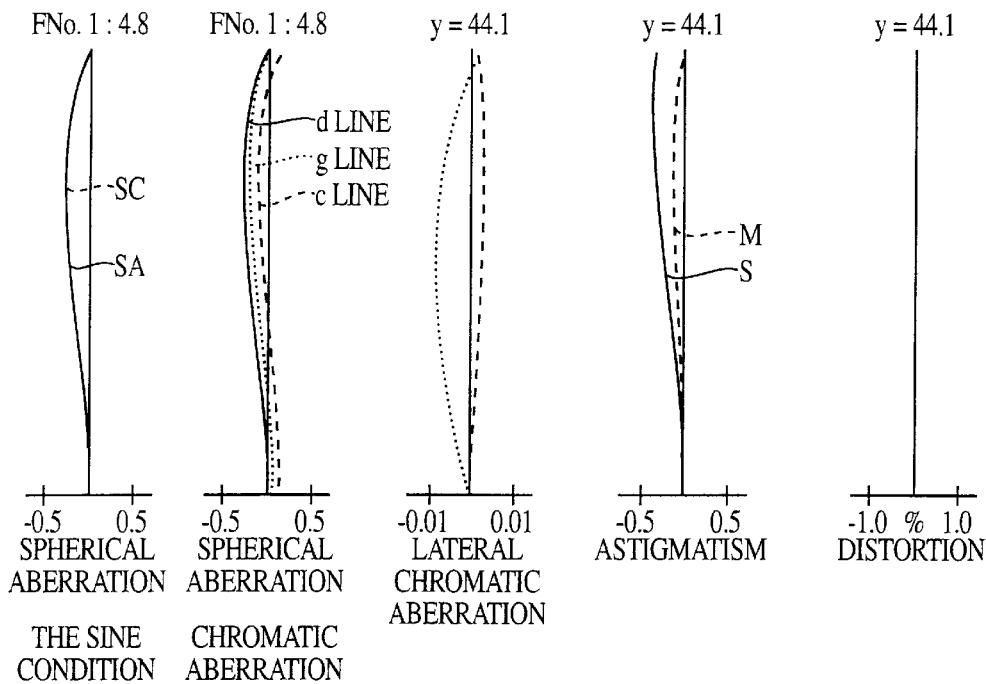
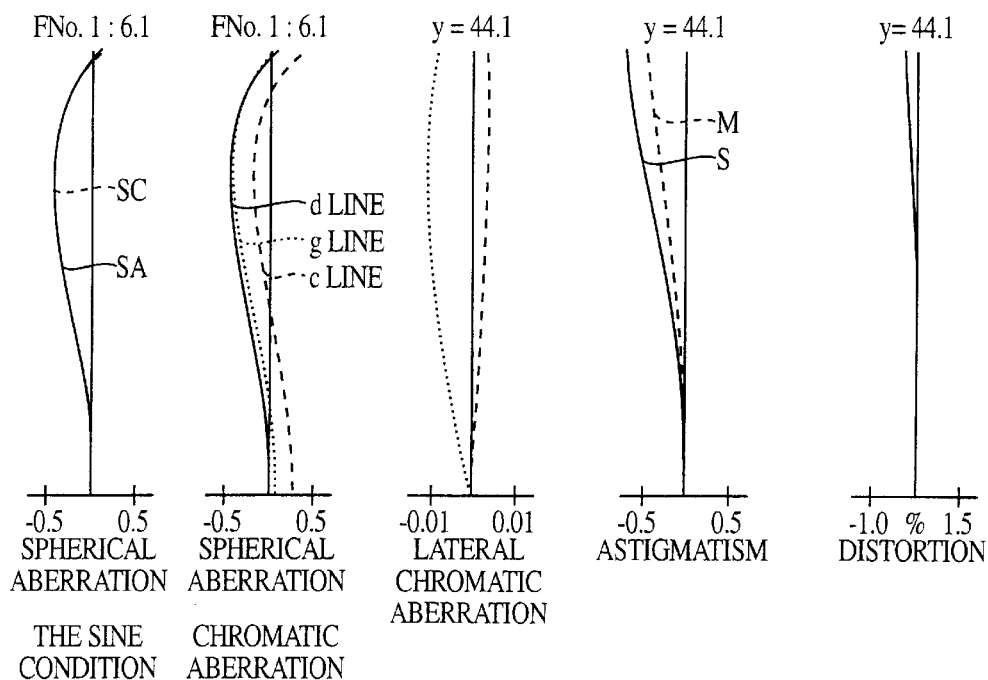

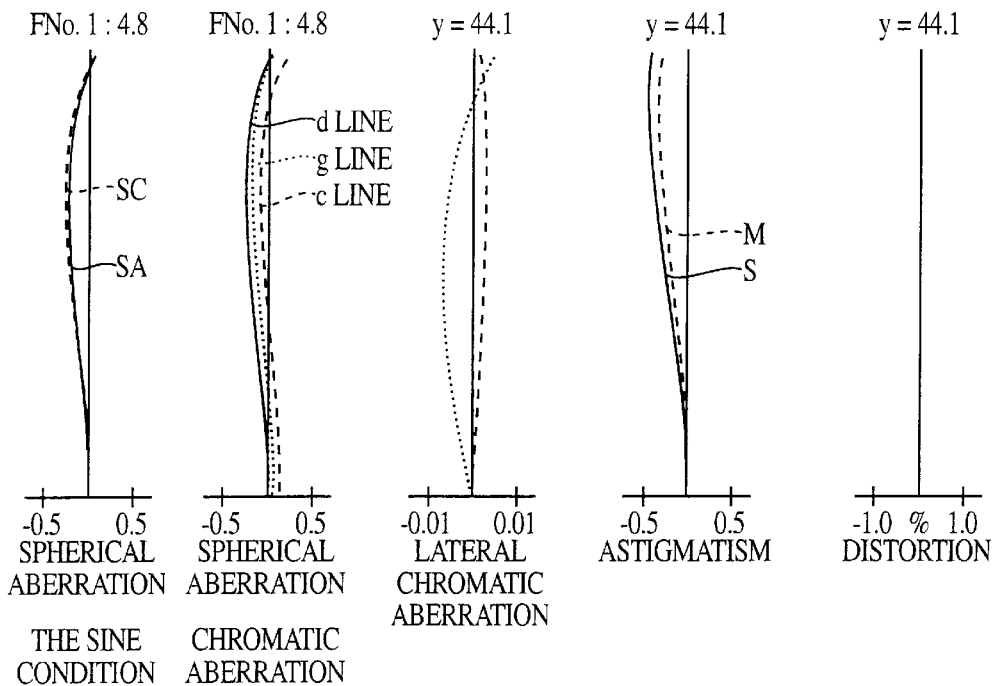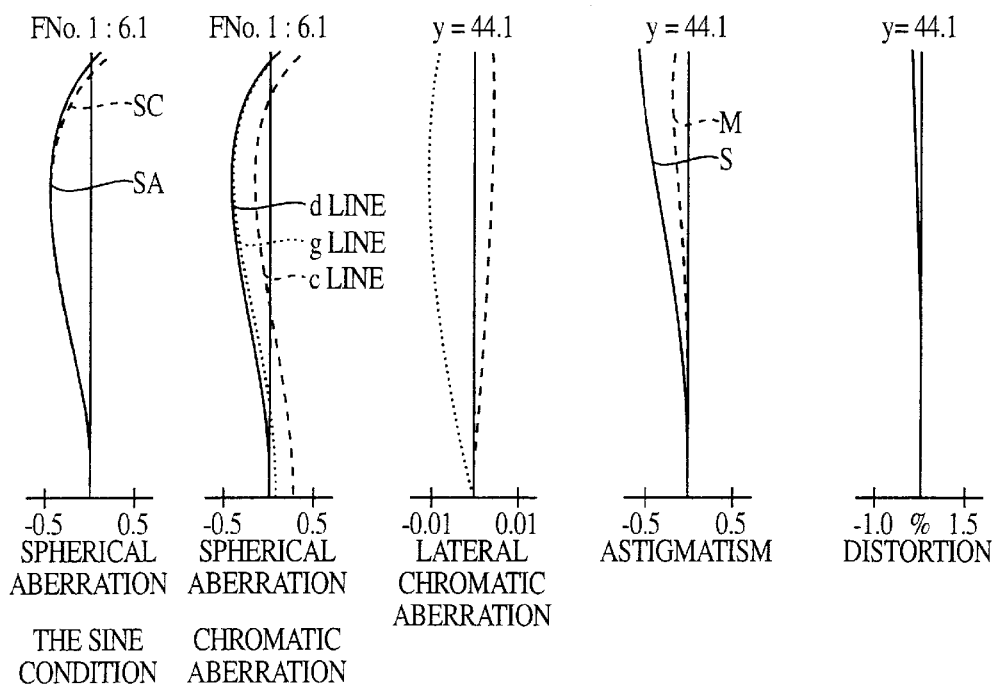

PHOTOGRAPHIC LENS

BACKGROUND OF THE INVENTION

1. Field of the Invention

The present invention relates to a photographic lens having a Gauss orthoscopic lens having six lens elements which are contained in two lens groups.

2. Description of the Related Art

This type of photographic lens has been known in, for example, Japanese Laid-Open Patent Publications (No.48-25528 and No.58-9117). Both of these applications have a two-lens group arrangement. The front lens group contains first, second and third lens elements, all of which are positive meniscus lenses having convex surfaces facing the object side. The second and third lens elements are cemented. The rear lens group contains the fourth, fifth and sixth lens elements. The fourth lens element is either positive meniscus lens or negative meniscus lens having a convex surface facing the image side. The fifth lens element having two concave surfaces, and the sixth lens elements having two convex surfaces, are cemented.

However, in the above-mentioned photographic lenses of the related art, aberration fluctuations, which occur due to a change of magnification when focusing is carried out to comply with a change of the object distances, are relatively large. Consequently, coma increases more when focusing is carried out on the object at a closer distance than when focusing is carried out on the object at a longer object distance, and a change of field curvature becomes excessive. In other words, the closer the object distance is, the more coma increases. Quality of image-forming performance worsens considerably especially when close-up photography is carried out at a magnification of around 0.5.

SUMMARY OF THE INVENTION

The object of the present invention, with the above-mentioned disadvantages taken into consideration, is to provide a photographic lens which can attain satisfactory image-forming performance even when close-up photography is carried out at a magnification of 0.5.

To achieve the above mentioned object there is provided a photographic lens comprising: a front lens group and a rear lens group that are arranged in order from the object side; wherein the front lens group comprises, in order from the object side, a first lens element which is a positive meniscus lens having a convex surface facing the object side, a second lens element which is a positive meniscus lens having a convex surface facing the object side, and a third lens element that is cemented to the second lens element, the third lens element being a negative meniscus lens having a convex surface facing the object side; wherein said rear lens group comprises, in order from the object side, a fourth lens element which is a positive meniscus lens having a convex surface facing the image side; a fifth lens element which is a negative meniscus lens having a concave surface on the object side; a sixth lens element that is cemented to the fifth lens element, the sixth lens element being a positive meniscus lens having a convex surface on the image side; and wherein the front lens group and the rear lens group are moved toward the object side so that the distance between the front and rear lens groups increases when a focusing operation is performed on the object at a closer object distance than when a focusing operation is performed on the object at a longer object distance.

Under the condition that the traveling distance of the front lens group is designated as $\Delta x1$ and the traveling distance of the rear lens group is designated as $\Delta x2$, the ratio $\Delta x2/\Delta x1$ can be a constant value throughout a range defined by an in-focus state at infinity and by an in-focus state at the closest object distance. Furthermore, the ratio $\Delta x2/\Delta X1$ preferably satisfies the following condition (1):

$$0.80 < \Delta x2/\Delta x1 < 0.99 \quad (1)$$

In addition, under the condition that the ratio $\Delta x2/\Delta x1$ is made variable, the ratio $\Delta x2/\Delta x1$ when an in-focus state is obtained at infinity is designated as XF, and the ratio $\Delta x2/\Delta x1$ when an in-focus state is obtained at the closest object distance is designated as XN, and the following conditions (2) is preferably satisfied:

$$0.0 < XN - XF < 0.1 \quad (2)$$

Still further, under the condition that d6 is designated as the thickness of the fourth lens element, and f is the focal length of the entire lens system of the photographic lens, preferably the fourth lens is formed so that the following condition (3) is satisfied:

$$0.01 < d6/f < 0.05 \quad (3)$$

The present disclosure relates to subject matter contained in Japanese Patent Application No.9-219894 (filed on Jul. 31, 1997) which is expressly incorporated herein by reference in its entirety.

BRIEF DESCRIPTION OF THE DRAWINGS

The invention will be discussed below in detail with reference to the accompanying drawings, in which:

FIGS. 3A, 3B, 3C, 3D and 3E show aberration diagrams of the photographic lens when focused at an intermediate distance under the condition that the ratio, $\Delta x2/\Delta x1$, of traveling distances of the front and rear lens group is constant;

FIGS. 4A, 4B, 4C, 4D and 4E show aberration diagrams of the photographic lens when focused at the most close-up distance under the condition that the ratio, $\Delta x2/\Delta x1$, of traveling distances of the front and rear lens group is constant;

FIGS. 5A, 5B, 5C, 5D and 5E show aberration diagrams of the photographic lens when focused at an intermediate distance under the condition that the ratio, $\Delta x2/\Delta x1$, of traveling distances of the front and rear lens group is variable;

FIGS. 6A, 6B, 6C, 6D, and 6E show aberration diagrams of the photographic lens when focused at the most close-up distance under the condition that the ratio, $\Delta x2/\Delta x1$, of traveling distances of the front and rear lens group is variable;

DESCRIPTION OF THE PREFERRED EMBODIMENT

Figure 1:
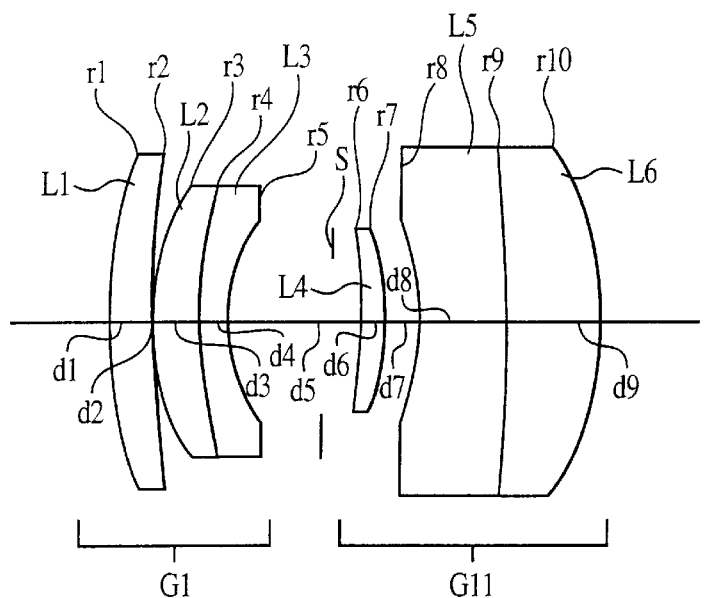
FIG. 1 is a lens arrangement of a photographic lens of the embodiment.

The following is the embodiment of the photographic lens according to the present invention. The arrangement of the photographic lens is, for example, as shown in FIG. 1; the front lens group GI, the diaphragm S, and the rear lens GII are provided in this order from the object side (from the left side of the lens arrangement in FIG. 1).

The front lens group GI is composed of, in order from the object side, a first lens element L1 which is a positive meniscus lens having a convex surface facing the object side, a second lens element L2 which is a positive meniscus lens having a convex surface facing the object side, and a third lens element L3 which is a negative meniscus lens having a convex surface facing the object side. The second and third lens elements L2 and L3 are cemented to each other. Furthermore, the rear lens group GII is composed of, in order from the object side, a fourth lens element L4 which is a positive meniscus lens having a convex surface facing the image side, a fifth lens element L5 which is a negative meniscus lens having a concave surface facing the object side, a sixth lens element L6 which is a positive meniscus lens having a convex surface on the image side. The fifth and sixth lens elements L5 and L6 are cemented to each other.

In the embodiment, all of the lenses have meniscus shapes with the concave surfaces facing the diaphragm S. With respect to the diaphragm S, by symmetrically positioning the lenses, each of which is made so that the so-called aplanatic conditions are satisfied, various aberrations can be curbed. Furthermore, the distance between the front lens group GI and the rear lens groups GII is made longer when focusing is being carried out toward the object at a closer distance so as to improve the quality of image-forming performance of the photographic lens at the time of close-up photography. Accordingly, when the object positioned at the closest distance (i.e.,the best possible closest object distance for close-up photography) from a camera, outer coma is curbed, and field curvature is corrected so as not to be over. The outer com means that the "tail" of the image lies in the radially-outer side with respect to the center of a picture plane. It should be understood that the above over field curvature means a state where an off-axis imaging point is formed behind the paraxial imaging point along the light progressing path (positive direction). In the same way, an under field curvature means a state where an off-axis imaging point is formed before the paraxial imaging point along the light progressing path (negative direction).

For carrying out focusing, the front lens group GI and the rear lens group GII are moved in the direction of the object. It should be noted that the traveling distance of the front lens group GI is arranged to become longer than that of the rear lens group GII when a focusing operation is performed on the object at a closer object distance than a longer object distance. In other words, the distance between those two lens groups GI and GII at the time of focusing at a closer object distance becomes gradually longer than that of those lens groups GI and GII at the time of focusing at a longer object distance. The ratio the traveling distances is set so as to satisfy the following condition (1):

$$0.80 < \Delta x2/\Delta x1 < 0.99 \qquad (1)$$

wherein:
Δx1 designates the traveling distance of the front lens group GI, and Δx2 designates the traveling distance of the rear lens group GII.

Condition (1) determines that the traveling distance of the rear lens group GII is less than that of the front lens group GI at a predetermined ratio. If this condition is satisfied, coma and field curvature are curbed even when photographing is being carried out at the closest object distance, so that a satisfactory image-forming can be achieved. If Δx2/Δx1 exceeds the lower limit, the distance between the two lens groups becomes too long when photographing is being carried out at the closest object distance, and inner coma is generated and field curvature becomes under. The inner coma means that the "tail" of the image lies in the radially-inner side with respect to the center of a picture plane. If Δx2/Δx1 exceeds the upper limit, since the distance between the lens groups GI and GII at the infinity position (FIG. 7) and the closest object distance position (FIG. 7) does not vary (that is, the ratio is substantially 1), outer coma is generated, and field curvature becomes over.

The above-mentioned ratio Δx2/Δx1 of the front and rear lens groups GI and GII can be a constant value throughout a range defined by an in-focus state at infinity and by an in-focus state at the closest object distance, whereas can be variable within the range of condition (1). When the ratio Δx2/Δx1 is a constant value, and if the ratio Δx2/Δx1 is determined so that image forming is ideal at the time of focusing at infinity and the closest object distance, satisfactory image-forming performance can not be attained at an intermediate object distance, and hence, coma is generated, and slightly over field curvature is generated. Therefore, it is necessary to determine the ratio so that a balance among focusing state on an object at infinity, at an intermediate distance and the closest object distance position should be considered.

On the other hand, in the case where the ratio Δx2/Δx1 is made variable, the ratio is set so as to satisfy the following condition (2):

$$0.0 < XN - XF < 0.1 \qquad (2)$$

wherein:
XF designates the ratio Δx2/Δx1 when an in-focus state is obtained at infinity, and XN designates the ratio Δx2/Δx1 when an in-focus state is obtained at the closest object distance.

Condition (2) determines that the distance between the front and rear lens groups GI, GII when an in-focus state is obtained at infinity (an infinity in-focus state) and at the closest object distance (a closest in-focus state) respectively. More concretely, the distance of those lens groups GI and GII at or in the vicinity of the infinity in-focus state is shorter, at a predetermined ratio, than that of those lens groups GI and GII at or in the vicinity of the closest in-focus state. If this condition is satisfied, in comparison with a constant ratio of Δx2/Δx1, coma and field curvature can be satisfactorily corrected at infinity, intermediate, and closer object distances, and satisfactory image-forming can be attained. If condition (2) is not satisfied, it is difficult to maintain satisfactory image-forming performance for all object distances.

Figure 7:
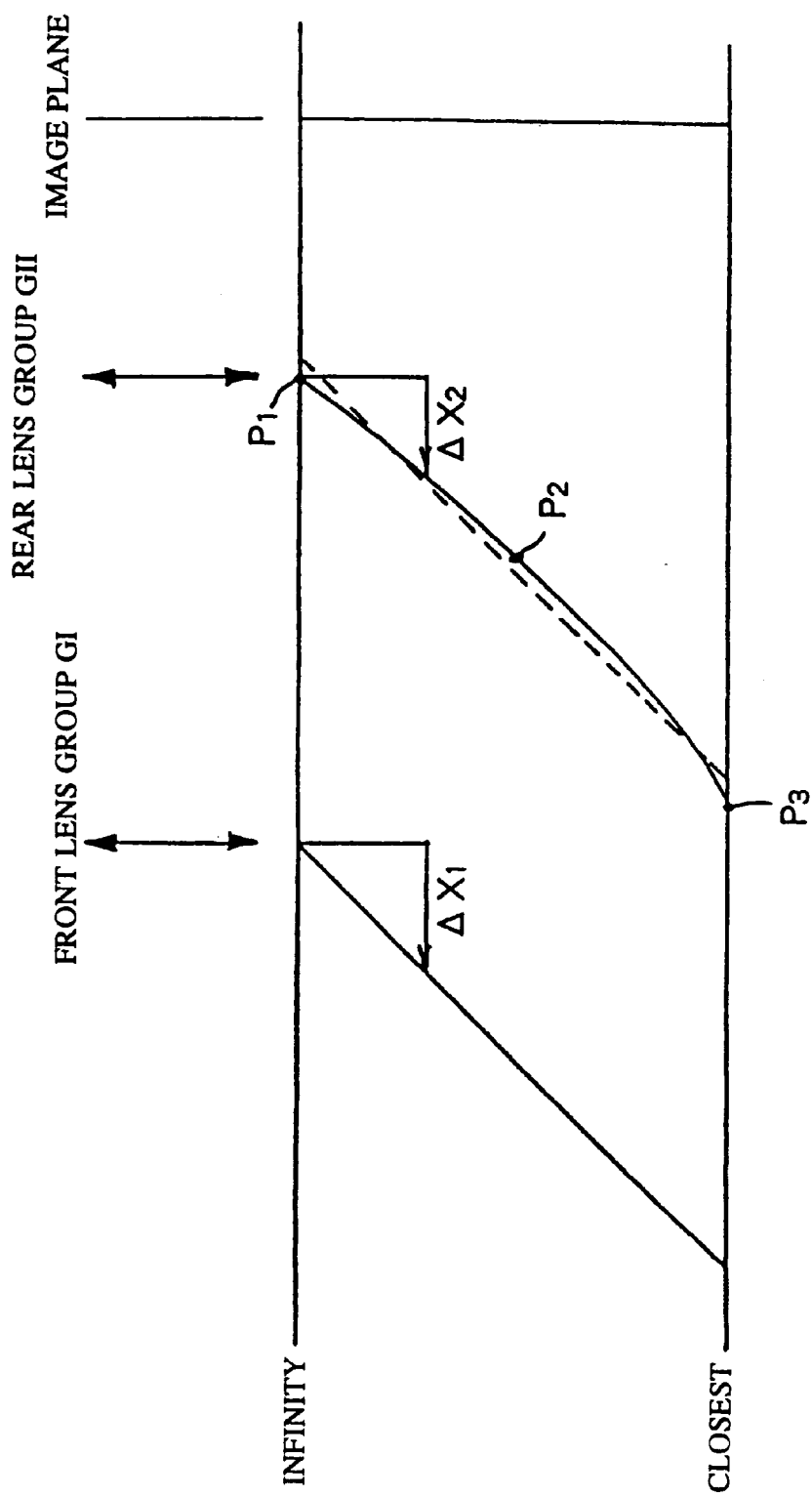
FIG. 7 shows the traveling paths of each lens group of the photographic lens at the time of focusing.

FIG. 7 shows the traveling paths of the front lens group GI and the rear lens group GII with respect to the imaging plane as the reference plane. In the case where the traveling path of the front lens group GI is a straight line, and if the ratio Δx2/Δx1 is a constant value, the traveling path of the rear lens group GII is also a straight line as shown by a broken line in FIG. 7. On the other hand, in the case where the ratio Δx2/Δx1 is made variable while consideration is given to curb optical errors, such as coma and field curvature, at any given object distance (within the range between the infinity object distance position and the closest object distance position of the lens groups GI and GII), the traveling path of the rear lens group GII will be a curved line as shown by a solid line in FIG. 7. Consequently, the rear lens group GII can be positioned at the points P1, P2 and P3 of each object distance achieving an optimum image-forming performance.

Furthermore, the thickness d6 of the fourth lens element L4 is determined, with respect to the focal length of the entire lens system, to satisfy the following condition (3):

$$0.01 < d6/f < 0.05 \quad (3)$$

If the value of d6 becomes too large for d6/f to exceed the upper limit, the fourth lens L4 becomes less-effective or correcting astigmatism. Then, astigmatism of the entire lens system increases. If d6/f exceeds the lower limit, it becomes difficult to machine the fourth lens element L4.

Embodiment

FIG. 1 is a lens arrangement of a photographic lens of the embodiment when focused on an object at infinity, and specific numerical data is shown in Table 1. In Figures and in the Tables, F no. designates the F-number, f designates the focal length (mm) at infinity, w designates the half angle of view (degrees) at infinity, fB designates the back focal length, Mg designates the image forming magnification, y designates the optical image height, r designates the radius of curvature of each lens surface (mm), d designates the lens thickness or distance (mm), nd designates the refractive index of the d-line (588 nm) of each lens element, and ν designates the Abbe number of each lens element.

In Table 1, surface Nos. 1 and 2 are the first lens element L1, surface Nos. 3 and 4 are the second lens element L2, surface Nos. 4 and 5 are the third lens element L3, surface Nos. 6 and 7 are the fourth lens element L4, surface Nos. 8 and 9 are the fifth lens element L5, and surface Nos. 9 and 10 are the sixth lens element L6. The diaphragm S is provided at a position 4.00 mm, in the direction of the object, from the object-side-surface of the fourth lens element L4. Moreover, the diaphragm is arranged to move together with the rear lens group GII upon focusing. It should be noted that with regard to the fourth lens element the ratio d6/f=0.025 is obtained, which means that the fourth lens L4 satisfies condition (3).

TABLE 1

| f = 100.00 mm Surface No. | w = 23.7° r | d | nd | ν |
|---|---|---|---|---|
| 1 | 46.514 | 4.40 | 1.72000 | 43.7 |
| 2 | 95.930 | 0.20 | — | — |
| 3 | 25.072 | 4.80 | 1.67790 | 55.3 |
| 4 | 48.815 | 2.80 | 1.62004 | 36.3 |
| 5 | 17.756 | 13.30 | — | — |
| 6 | −83.510 | 2.25 | 1.74400 | 44.8 |
| 7 | −43.482 | 3.45 | — | — |
| 8 | −28.607 | 9.00 | 1.74077 | 27.8 |
| 9 | −169.022 | 10.00 | 1.72000 | 43.7 |
| 10 | −33.134 | — | — | — |

Figures 2A, 2B, 2C, 2D, 2E:
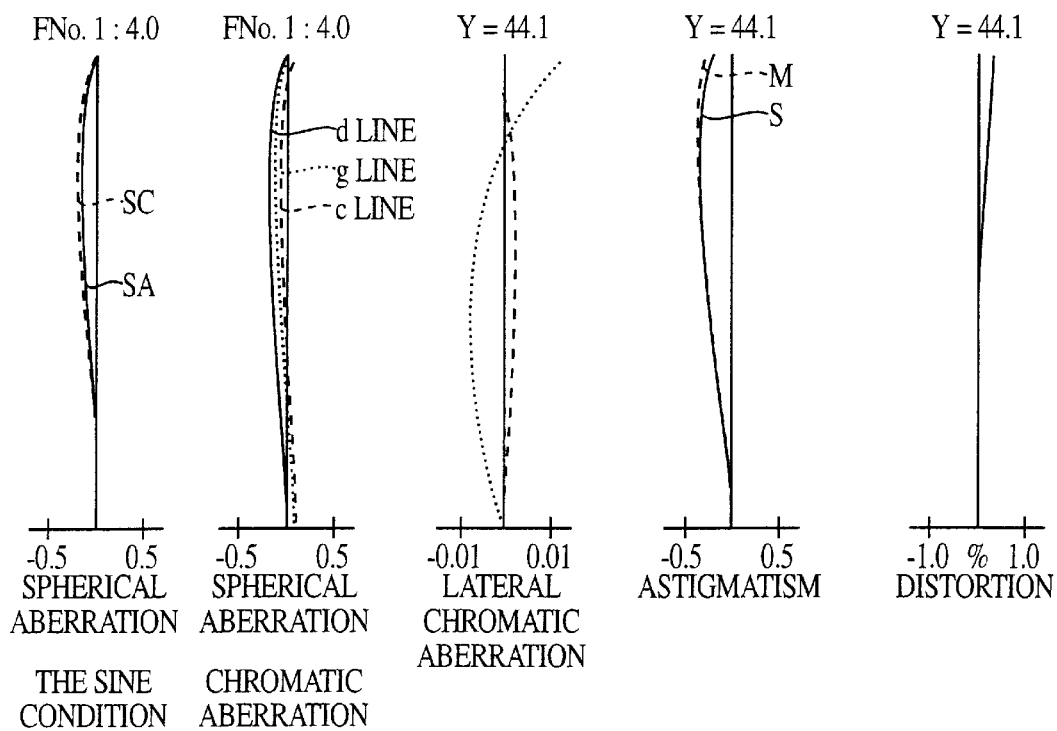
FIGS. 2A, 2B, 2C, 2D and 2E show aberration diagrams of the photographic lens when focused at infinity.

FIGS. 2A, 2B, 2C, 2D and 2E show aberration diagrams the photographic lens of the embodiment when focused at infinity. FIG. 2A shows spherical aberration SA and the sine condition SC of the d-line, FIG. 2B shows Chromatic aberration represented by spherical aberration at the respective wave length of the d-line, g-line (wave-length 436 nm) and c-line (wave-length 656 nm). FIGS. 2C shows lateral chromatic aberration of the g-line and the c-line with respect to the d-line as a reference wave-length. FIGS. 2D shows astigmatism (S designates the sagittal focal surface; M designates the meridional focal surface). FIGS. 2E shows distortion. The unit of distortion, which is shown along the abscissa (horizontal axis), is a percentage, and the unit of other aberrations, which is shown along the abscissa (horizontal axes), is millimeters.

With respect to the lens arrangement according to Table 1, the lens driving method (a) in which the ratio Δx2/Δx1 is a constant value, and the lens driving method (b) in which the ratio Δx2/Δx1 is variable, will now be explained. In the case of the driving method (a) having a constant ratio, the F-number which changes along with focusing, the distance d5 between lens groups GI and GII, the back focal length fB, and image formation magnification Mg are shown in Table 2.

TABLE 2

|  | Infinity | Intermediate | Closest |
|---|---|---|---|
| F no. | 1:4.0 | 1:4.8 | 1:6.1 |
| d5 | 13.30 | 14.35 | 16.04 |
| fB | 77.45 | 97.27 | 129.36 |
| Mg | — | −0.200 | −0.520 |

In the case of the lens driving method (a), the ratio Δx2/Δx1 is constantly set at 0.95, and satisfies condition (1). FIGS. 3A to 3E show aberrations when an in-focus state is obtained, according to the lens driving method (a), at an intermediate object distance, and FIGS. 4A to 4E show aberrations when an in-focus state is obtained, according to the lens driving method (a), at the closest object distance.

In the case of the lens driving method (b), the F-number which changes along with focusing, the distance d5 between lens groups GI and GII, the back focus fB, and image formation magnification Mg are shown in Table 3. The values at infinity are the same as those of Table 2, whereas the distance d5 between the lens groups GI and GII and the back focus fB differ to those of Table 2.

TABLE 3

|  | Infinity | Intermediate | Closest |
|---|---|---|---|
| F no. | 1:4.0 | 1:4.8 | 1:6.1 |
| d5 | 13.30 | 14.88 | 15.56 |
| fB | 77.45 | 97.17 | 129.38 |
| Mg | — | −0.200 | −0.520 |

In the case of driving method (b), the ratio Δx2/Δx1 when an in-focus state is obtained at infinity is XF=0.907, the ratio ΔX2/Δx1 when an in-focus state is obtained at the closest object distance is XN=0.958. This means that not only Δx2/Δx1 (condition (1)) but also XN−XF (condition (2)) is satisfied because of the values of XF=0.907 and XN=0.958, and XN−XF=0.051. FIGS. 5A to 5E show aberrations when an in-focus state is obtained, according to the lens driving method (b), at an intermediate object distance, and FIGS. 6A to 6E show aberrations when an in-focus state is obtained, according to the lens driving method (b), at the closest object distance.

As explained above, when close-up photography with a magnification of 0.5 is carried out, according to the present invention, a photographic lens having satisfactory image-forming performance can be attained.

What is claimed is:

1. A photographic lens comprising:
   a front lens group and a rear lens group that are arranged in order from the object side;
   wherein said front lens group comprises, in order from the object side,
   a first lens element which is a positive meniscus lens having a convex surface facing the object side,
   a second lens element which is a positive meniscus lens having a convex surface facing the object side, and
   a third lens element that is cemented to said second lens element, said third lens element being a negative meniscus lens having a convex surface facing the object side;

wherein said rear lens group comprises, in order from the object side, a fourth lens element which is a positive meniscus lens having a convex surface facing the image side;

a fifth lens element which is a negative meniscus lens having a concave surface facing the object side;

a sixth lens element that is cemented to said fifth lens element, said sixth lens element being a positive meniscus lens having a convex surface facing the image side; and wherein said front lens group and said rear lens group are moved toward the object side during a focusing operation and a distance between said front and rear lens groups increases when a focusing operation is performed on the object at a close object distance in comparison with when a focusing operation is performed on the object at a far object distance.

2. The photographic lens according to claim 1, wherein the traveling distance of said front lens group is designated as $\Delta x1$ and the traveling distance of said rear lens group is designated as $\Delta x2$, and wherein the ratio $\Delta x2/\Delta x1$ is a constant value throughout a range defined by an in-focus state at infinity and by an in-focus state at the closest object distance.

3. The photographic lens according to claim 2, wherein said ratio $\Delta x2/\Delta x1$ satisfies the following condition:

$$0.80 < \Delta x2/\Delta x1 < 0.99.$$

4. The photographic lens according to claim 1, wherein d6 is designated as the thickness of said fourth lens element, and f is the focal length of the entire lens system of said photographic lens; and wherein said fourth lens is formed so that the following condition is satisfied:

$$0.01 < d6/f < 0.05.$$

5. A photographic lens comprising:

a front lens group and a rear lens group arranged in this order from the object side;

said front lens group comprising, in this order from the object side:

a first lens element comprising a positive meniscus lens having a convex surface facing the object side;

a second lens element comprising a positive meniscus lens having a convex surface facing the object side; and a third lens element cemented to said second lens element, said third lens element comprising a negative meniscus lens having a convex surface facing the object side;

said rear lens group comprising, in this order from the object side:

a fourth lens element comprising a positive meniscus lens having a convex surface facing the image side;

a fifth lens element comprising a negative meniscus lens having a concave surface facing the object side;

a sixth lens element cemented to said fifth lens element, said sixth lens element comprising a positive meniscus lens having a convex surface facing the image side; and said front lens group and said rear lens group being mounted for movement so that a distance between said front lens group and said rear lens group changes as a focus distance changes, said front lens group and said rear lens group being mounted for movement towards the object side as said focus distance decreases and a distance between said front lens group and said rear lens group increases as a focusing distance decreases.

6. The photographic lens according to claim 7, a moving distance of said front lens group is defined as $\Delta x1$ and a moving distance of said rear lens group is defined as $\Delta x2$, wherein the ratio $\Delta x2/\Delta x1$ has a constant value throughout a range of movement defined by an in-focus position at infinity and by an in-focus position at a closest object distance.

7. The photographic lens according to claim 8, wherein said ratio $\Delta x2/\Delta x1$ satisfies the following relationship:

$$0.80 < \Delta x2/\Delta x1 < 0.99.$$

8. The photographic lens according to claim 7, wherein d6 designates a thickness of said fourth lens element, f designates a focal length of the entire lens system of said photographic lens, and wherein the following relationship is satisfied:

$$0.01 < d6/f < 0.05.$$

* * * * *